(12) United States Patent
Bluman et al.

(10) Patent No.: US 8,068,602 B1
(45) Date of Patent: Nov. 29, 2011

(54) SYSTEMS AND METHODS FOR RECORDING USING VIRTUAL MACHINES

(75) Inventors: Scott Bluman, Atlanta, GA (US); Oirong Li, Alpharetta, GA (US)

(73) Assignee: Verint Americas, Inc., Roswell, GA (US)

( * ) Notice: Subject to any disclaimer, the term of this patent is extended or adjusted under 35 U.S.C. 154(b) by 1459 days.

(21) Appl. No.: 11/540,450

(22) Filed: Sep. 29, 2006

(51) Int. Cl.
*H04M 3/00* (2006.01)

(52) U.S. Cl. .......................... 379/266.1; 709/1; 709/227

(58) Field of Classification Search .............. 379/265.01
See application file for complete search history.

(56) References Cited

U.S. PATENT DOCUMENTS

| | | | |
|---|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |

(Continued)

FOREIGN PATENT DOCUMENTS

EP 0453128 A2 10/1991

(Continued)

OTHER PUBLICATIONS

"Customer Spotlight: Navistar International," Web pae, unverified print date of Apr. 1, 2002.

(Continued)

*Primary Examiner* — Creighton Smith (74) *Attorney, Agent, or Firm* — McKeon, Meunier, Carlin & Curfman, LLC (57) ABSTRACT

A recording system that includes software configured to enable a first guest operating system to function in a virtual machine operating environment, a first recording software enabled to function by the first guest operating system, at least one processor, and at least one communication interface configured to receive first data corresponding to a first contact corresponding to a first contact center agent. The at least one processor is instructed by the first recording software to cause the first data to be stored in memory.

8 Claims, 9 Drawing Sheets

U.S. PATENT DOCUMENTS

| | | | |
|---|---|---|---|
| 5,572,652 A | 11/1996 | Robusto et al. | |
| 5,577,112 A | 11/1996 | Cambray et al. | |
| 5,590,171 A | 12/1996 | Howe et al. | |
| 5,597,312 A | 1/1997 | Bloom et al. | |
| 5,619,183 A | 4/1997 | Ziegra et al. | |
| 5,696,906 A | 12/1997 | Peters et al. | |
| 5,717,879 A | 2/1998 | Moran et al. | |
| 5,721,842 A | 2/1998 | Beasley et al. | |
| 5,742,670 A | 4/1998 | Bennett | |
| 5,748,499 A | 5/1998 | Trueblood | |
| 5,778,182 A | 7/1998 | Cathey et al. | |
| 5,784,452 A | 7/1998 | Carney | |
| 5,790,798 A | 8/1998 | Beckett, II et al. | |
| 5,796,952 A | 8/1998 | Davis et al. | |
| 5,809,247 A | 9/1998 | Richardson et al. | |
| 5,809,250 A | 9/1998 | Kisor | |
| 5,825,869 A | 10/1998 | Brooks et al. | |
| 5,835,572 A | 11/1998 | Richardson, Jr. et al. | |
| 5,862,330 A | 1/1999 | Anupam et al. | |
| 5,864,772 A | 1/1999 | Alvarado et al. | |
| 5,884,032 A | 3/1999 | Bateman et al. | |
| 5,907,680 A | 5/1999 | Nielsen | |
| 5,918,214 A | 6/1999 | Perkowski | |
| 5,923,746 A * | 7/1999 | Baker et al. | 379/265.02 |
| 5,933,811 A | 8/1999 | Angles et al. | |
| 5,944,791 A | 8/1999 | Scherpbier | |
| 5,948,061 A | 9/1999 | Merriman et al. | |
| 5,951,652 A * | 9/1999 | Ingrassia et al. | 709/248 |
| 5,954,798 A * | 9/1999 | Shelton et al. | 709/224 |
| 5,958,016 A | 9/1999 | Chang et al. | |
| 5,964,836 A | 10/1999 | Rowe et al. | |
| 5,978,648 A | 11/1999 | George et al. | |
| 5,982,857 A | 11/1999 | Brady | |
| 5,987,466 A | 11/1999 | Greer et al. | |
| 5,990,852 A | 11/1999 | Szamrej | |
| 5,991,373 A | 11/1999 | Pattison et al. | |
| 5,991,796 A | 11/1999 | Anupam et al. | |
| 6,005,932 A | 12/1999 | Bloom | |
| 6,009,429 A | 12/1999 | Greer et al. | |
| 6,014,134 A | 1/2000 | Bell et al. | |
| 6,014,647 A | 1/2000 | Nizzari et al. | |
| 6,018,619 A | 1/2000 | Allard et al. | |
| 6,035,332 A * | 3/2000 | Ingrassia et al. | 709/224 |
| 6,038,544 A | 3/2000 | Machin et al. | |
| 6,039,575 A | 3/2000 | L'Allier et al. | |
| 6,047,053 A * | 4/2000 | Miner et al. | 379/201.01 |
| 6,057,841 A | 5/2000 | Thurlow et al. | |
| 6,058,163 A | 5/2000 | Pattison et al. | |
| 6,061,798 A | 5/2000 | Coley et al. | |
| 6,072,860 A | 6/2000 | Kek et al. | |
| 6,076,099 A | 6/2000 | Chen et al. | |
| 6,078,894 A | 6/2000 | Clawson et al. | |
| 6,091,712 A | 7/2000 | Pope et al. | |
| 6,108,711 A | 8/2000 | Beck et al. | |
| 6,122,665 A | 9/2000 | Bar et al. | |
| 6,122,668 A | 9/2000 | Teng et al. | |
| 6,130,668 A | 10/2000 | Stein | |
| 6,138,139 A | 10/2000 | Beck et al. | |
| 6,144,991 A | 11/2000 | England | |
| 6,146,148 A | 11/2000 | Stuppy | |
| 6,151,622 A | 11/2000 | Fraenkel et al. | |
| 6,154,771 A | 11/2000 | Rangan et al. | |
| 6,157,808 A | 12/2000 | Hollingsworth | |
| 6,171,109 B1 | 1/2001 | Ohsuga | |
| 6,182,094 B1 | 1/2001 | Humpleman et al. | |
| 6,195,679 B1 | 2/2001 | Bauersfeld et al. | |
| 6,201,948 B1 | 3/2001 | Cook et al. | |
| 6,211,451 B1 | 4/2001 | Tohgi et al. | |
| 6,225,993 B1 | 5/2001 | Lindblad et al. | |
| 6,230,197 B1 | 5/2001 | Beck et al. | |
| 6,236,977 B1 | 5/2001 | Verba et al. | |
| 6,244,758 B1 | 6/2001 | Solymar et al. | |
| 6,256,393 B1 * | 7/2001 | Safadi et al. | 380/232 |
| 6,282,548 B1 | 8/2001 | Burner et al. | |
| 6,286,030 B1 | 9/2001 | Wenig et al. | |
| 6,286,046 B1 | 9/2001 | Bryant | |
| 6,288,753 B1 | 9/2001 | DeNicola et al. | |
| 6,289,340 B1 | 9/2001 | Puram et al. | |
| 6,301,462 B1 | 10/2001 | Freeman et al. | |
| 6,301,573 B1 | 10/2001 | McIlwaine et al. | |
| 6,324,282 B1 | 11/2001 | McIlwaine et al. | |
| 6,347,374 B1 | 2/2002 | Drake et al. | |
| 6,351,467 B1 | 2/2002 | Dillon | |
| 6,353,851 B1 | 3/2002 | Anupam et al. | |
| 6,360,250 B1 | 3/2002 | Anupam et al. | |
| 6,370,574 B1 | 4/2002 | House et al. | |
| 6,404,857 B1 | 6/2002 | Blair et al. | |
| 6,411,697 B1 * | 6/2002 | Creamer et al. | 379/201.12 |
| 6,411,989 B1 | 6/2002 | Anupam et al. | |
| 6,418,471 B1 * | 7/2002 | Shelton et al. | 709/227 |
| 6,459,787 B2 | 10/2002 | McIlwaine et al. | |
| 6,487,195 B1 | 11/2002 | Choung et al. | |
| 6,493,758 B1 | 12/2002 | McLain | |
| 6,496,850 B1 * | 12/2002 | Bowman-Amuah | 709/203 |
| 6,502,131 B1 | 12/2002 | Vaid et al. | |
| 6,510,220 B1 | 1/2003 | Beckett, II et al. | |
| 6,535,909 B1 | 3/2003 | Rust | |
| 6,542,602 B1 | 4/2003 | Elazer | |
| 6,546,405 B2 | 4/2003 | Gupta et al. | |
| 6,560,328 B1 | 5/2003 | Bondarenko et al. | |
| 6,583,806 B2 | 6/2003 | Ludwig et al. | |
| 6,606,657 B1 | 8/2003 | Zilberstein et al. | |
| 6,665,644 B1 | 12/2003 | Kanevsky et al. | |
| 6,674,447 B1 | 1/2004 | Chiang et al. | |
| 6,683,633 B2 | 1/2004 | Holtzblatt et al. | |
| 6,697,858 B1 | 2/2004 | Ezerzer et al. | |
| 6,724,887 B1 | 4/2004 | Eilbacher et al. | |
| 6,738,456 B2 | 5/2004 | Wrona et al. | |
| 6,757,361 B2 | 6/2004 | Blair et al. | |
| 6,772,396 B1 | 8/2004 | Cronin et al. | |
| 6,775,377 B2 | 8/2004 | McIlwaine et al. | |
| 6,792,575 B1 | 9/2004 | Samaniego et al. | |
| 6,810,414 B1 | 10/2004 | Brittain | |
| 6,820,083 B1 | 11/2004 | Nagy et al. | |
| 6,823,384 B1 | 11/2004 | Wilson et al. | |
| 6,870,916 B2 | 3/2005 | Henrikson et al. | |
| 6,901,438 B1 | 5/2005 | Davis et al. | |
| 6,959,078 B1 | 10/2005 | Eilbacher et al. | |
| 6,965,886 B2 | 11/2005 | Govrin et al. | |
| 2001/0000962 A1 | 5/2001 | Rajan | |
| 2001/0032335 A1 | 10/2001 | Jones | |
| 2001/0043697 A1 | 11/2001 | Cox et al. | |
| 2002/0038363 A1 | 3/2002 | MacLean | |
| 2002/0052948 A1 | 5/2002 | Baudu et al. | |
| 2002/0053072 A1 * | 5/2002 | Steinbusch et al. | 717/148 |
| 2002/0065911 A1 | 5/2002 | Von Klopp et al. | |
| 2002/0065912 A1 | 5/2002 | Catchpole et al. | |
| 2002/0128925 A1 | 9/2002 | Angeles | |
| 2002/0143925 A1 | 10/2002 | Pricer et al. | |
| 2002/0165954 A1 | 11/2002 | Eshghi et al. | |
| 2003/0033344 A1 * | 2/2003 | Abbott et al. | 709/1 |
| 2003/0055883 A1 | 3/2003 | Wiles et al. | |
| 2003/0079020 A1 | 4/2003 | Gourraud et al. | |
| 2003/0144900 A1 | 7/2003 | Whitmer | |
| 2003/0154240 A1 | 8/2003 | Nygren et al. | |
| 2003/0233386 A1 * | 12/2003 | Waki et al. | 709/100 |
| 2004/0100507 A1 | 5/2004 | Hayner et al. | |
| 2004/0165717 A1 | 8/2004 | McIlwaine et al. | |
| 2005/0013560 A1 | 1/2005 | Mazotti et al. | |
| 2005/0281470 A1 * | 12/2005 | Adams | 382/232 |
| 2006/0288345 A1 * | 12/2006 | Rice et al. | 718/1 |
| 2010/0077086 A1 * | 3/2010 | El Zur | 709/227 |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unvereified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"Price WaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of AI in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8$^{th}$ World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, @ pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 (© 2001).

De Bra et al., "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World-Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of *End-User Training Needs*," *Communications ACM* 38(7):27-39 (Jul. 1995).

O'Herron, "CenterForce Technologies' CenterForce Analyzer," Web page unverified print date of Mar. 2, 2002, unverified cover date of Jun. 1, 1999.

O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.

Papa et al., "A Differential Diagnostic Skills Assessment and Tutorial Tool," *Computer Education* 18(1-3):45-50 (1992).

PCT International Search Report, International Application No. PCT/US03/02541, mailed May 12, 2003.

Phaup, "New Software Puts Computerized Tests on the Internet: Presence Corporation announces breakthrough Question Mark™ Web Product," Web page, unverified print date of Apr. 1, 2002.

Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.

Phaup, "Question Mark Introduces Access Export Software," Web page, unverified print date of Apr. 2, 2002, unverified cover date of Mar. 1, 1997.

Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-' Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *Info World* 20(47):6467 (Nov. 23, 1998).
Unknown Author, "Long-distance learning," *Info World* 20(36):7676 (1998).
Untitled, 10$^{th}$ Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.

Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst. *It's Baa-aack. How Interative TV is Sneaking Into Your Living Room*, The AnchorDesk, May 10, 1999.
Berst. *Why Interactive TV Won't Turn You On (Yet)*,The AnchorDesk, Jul. 13, 1999.
Borland and Davis. *US West Plans Web Services on TV*, CNETNews.com, Nov. 22, 1999.
Brown. *Let PC Technology Be Your TV Guide*, PC Magazine, Jun. 7, 1999.
Brown. *Interactive TV: The Sequel*, NewMedia, Feb. 10, 1998.
Cline. Déjà vu—*Will Interactive TV Make It This Time Around?*, DevHead, Jul. 9, 1999.
Crouch. *TV Channels on the Web*, PC World, Sep. 15, 1999.
D'Amico. *Interactive TV Gets $99 set-top box*, IDG.net, Oct. 6, 1999.
Davis. *Satellite Systems Gear Up for Interactive TV Fight*, CNETNews.com, Sep. 30, 1999.
Diedrich. *Web TV Data Gathering Raises Privacy Concerns*, ComputerWorld, Oct. 13, 1998.
EchoStar, *MediaX Mix Interactive Multimedia With Interactive Television*, PRNews Wire, Jan. 11, 1999.
Furger. *The Internet Meets the Couch Potato*, PCWorld, Oct. 1996.
*Hong Kong Comes First with Interactive TV*, Sci-Tech, Dec. 4, 1997.
Needle. *Will the Net Kill Network TV?* PC World Online, Mar. 10, 1999.
Kane. *AOL-Tivo: You've Got Interactive TV*, ZDNN, Aug. 17, 1999.
Kay. *E-Mail in Your Kitchen*, PC World Online, 093/28/96.
Kenny. *TV Meets Internet*, PC World Online, Mar. 28, 1996.
Linderholm. *Avatar Debuts Home Theater PC*, PC World Online, Dec. 1, 1999.
Rohde. *Gates Touts Interactive TV*, InfoWorld, Oct. 14, 1999.
Ross. *Broadcasters Use TV Signals to Send Data*, PC World Oct. 1996.
Stewart. *Interactive Television at Home: Television Meets the Internet*, Aug. 1998.
Wilson. *U.S. West Revisits Interactive TV*, Interactive Week, Nov. 28, 1999.

\* cited by examiner

SYSTEMS AND METHODS FOR RECORDING USING VIRTUAL MACHINES

FIELD OF THE DISCLOSURE

The present disclosure generally relates to recording of data.

DESCRIPTION OF THE RELATED ART

Contact centers are staffed by agents who handle incoming and/or outgoing contacts. Although the traditional and most common form of contact is by phone, other types of contacts are becoming more common (e.g., text chat, web collaboration, email, and fax). In order to facilitate such contact, an agent workspace typically includes an agent phone and a workstation computer. A network connects one or more of the agent workstations.

During a customer contact, the agent interacts with one or more applications running on the workstation. Workstation applications give the agent access to customer records, product information, ordering status, and transaction history, for example.

Contact centers typically record contacts of its agents, along with data indicating what information was accessed or entered by the agent using the workstation. Recording is often performed by relatively expensive computers that include voice cards for enabling such a computer to receive and digitize communications. Unfortunately, an interruption in recording can occur if the computer experiences software and/or hardware failures.

SUMMARY

Recording systems and methods are disclosed. An embodiment of such a system includes software configured to enable a first guest operating system to function in a virtual machine operating environment, a first recording software enabled to function by the first guest operating system, at least one processor, and at least one communication interface configured to receive first data corresponding to a first contact corresponding to a first contact center, agent. The at least one processor is instructed by the first recording software to cause the first data to be stored in memory.

An embodiment of a recording method includes receiving by a recording system data that encodes first and second telephone signals from a telephony tap, the telephony tap being configured to receive a first telephone signal from a first telephone line coupled to a first telephone and a second telephone signal from a second telephone line couple to a second telephone, to digitize the first and second telephone signals, to generate the data that encodes the first and second telephone signals, and to transmit the data that encodes the first and second telephone signals to the recording system. The method also includes storing the data that encodes the first and second telephone signals by the recording system.

Another embodiment of a recording method includes receiving by a first recording system first information corresponding to a contact corresponding to an agent in a contact center, wherein the first recording system operates in conjunction with a first guest operating system that operates in a virtual machine environment; storing the first information corresponding to a contact by the first recording system; determining that the first recording system has experienced failure; responsive to determining that the first recording system has experienced failure, receiving by a second recording system second information corresponding to the agent, wherein the second recording system operates in conjunction with a second guest operating system that operates in a virtual machine environment; and storing the second information corresponding to a contact by the second recording system.

Other objects, features, and advantages of the embodiments will become apparent to one with skill in the art upon examination of the following drawings and detailed description.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate similar components throughout the several views.

DETAILED DESCRIPTION

Contact centers are staffed by agents who handle incoming and/or outgoing contacts (e.g., telephone calls, e-mails, facsimile transmissions, etc.). According to an embodiment of the invention, a virtual machine host uses a virtual recorder to record agent contacts. A plurality of virtual recorders may be used to record a plurality of contacts corresponding to a plurality of respective agents. The recording of agent contacts may be migrated from one virtual recorder to another (e.g., hosted by another virtual machine host) responsive to determining that a recording failure has occurred. An agent contact may also be recorded by a plurality of virtual recorders in order to ensure recording in case one of the plurality of virtual recorders (or corresponding host) fails.

Figure 1:
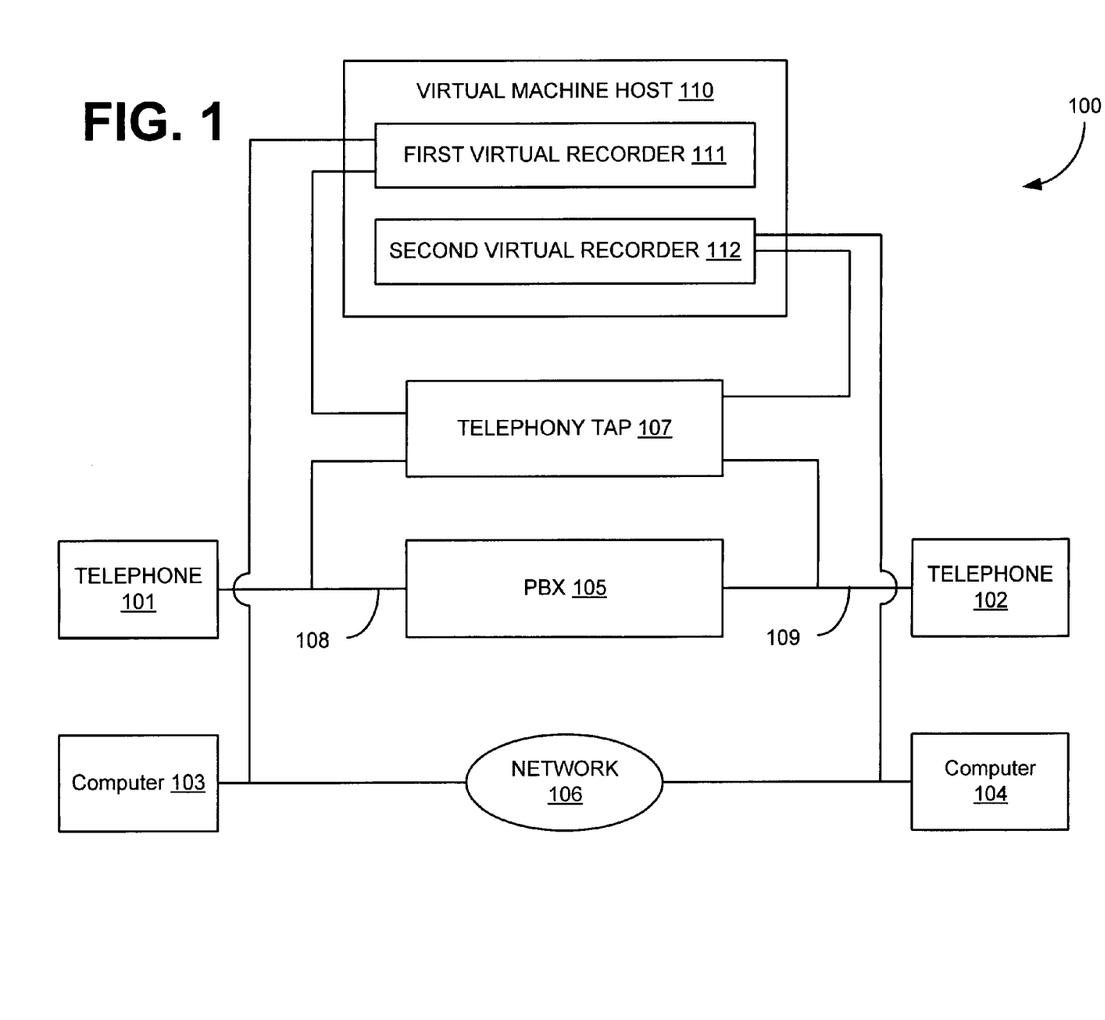
FIG. 1 is a simplified block diagram depicting an embodiment of a recording system.

FIG. 1 is a simplified block diagram depicting an embodiment of a recording system 100. The recording system may be located, for example, at a contact center premises. The recording system 100 includes telephones 101 and 102, computers 103 and 104, and a virtual machine host 110. In this embodiment, the telephone 101 and the computer 103 are part of a workspace for a first contact center agent. Similarly, the telephone 102 and the computer 104 are part of a workspace for a second contact center agent. The contact center agents receive telephone calls, for example, from customers and use their respective computers to help provide customer service. The computers 103 and 104 are connected to a network 106, which may be, for example, a local area network.

The virtual machine host 110 includes first and second virtual recorders 111 and 112. The first virtual recorder 111 is configured to record communications occurring via the telephone 101 and/or via the computer 103. The second virtual recorder 112 is configured to record communications occurring via the telephone 102 and/or via the computer 104. The telephones 101 and 102 are connected to a private branch exchange (PBX) 105 which enables communications for the telephones 101 and 102 (e.g., with other telephones not located on the premises).

The telephony tap 107 is used to tap telephone signals propagating on the telephone lines 108 and 109 (which are coupled to the telephones 101 and 102, respectively). The telephony tap 107 digitizes the telephone signals from the telephone lines 108 and 109, formats them into telephone data having a predetermined data format, and transmits the formatted telephone data to the virtual machine host 110 hosting the first and second virtual recorders 111 and 112. The first virtual recorder 111 stores the formatted telephone data corresponding to the telephone line 108 (and the telephone 101), whereas the second virtual recorder 112 stores the formatted telephone data corresponding to the telephone line 109 (and the telephone 102).

Figure 2:
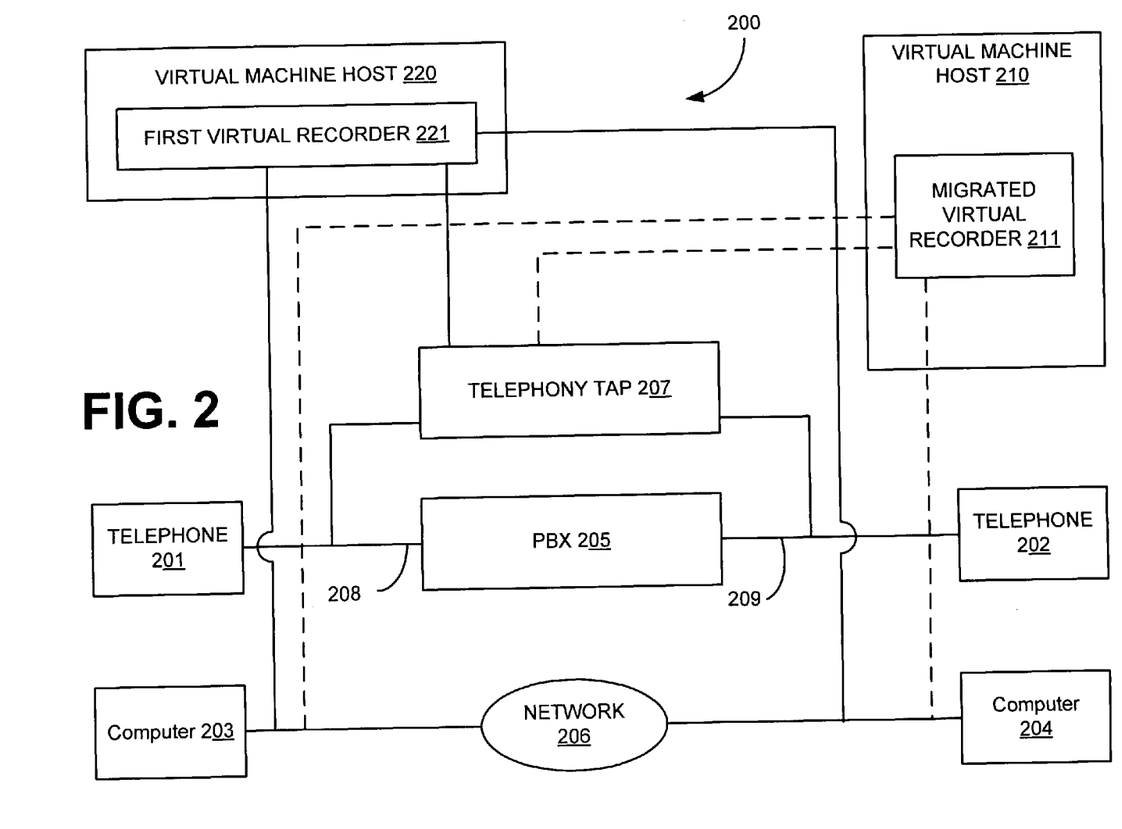
FIG. 2 is a simplified block diagram depicting an embodiment of a recording system configured to enable failover.

FIG. 2 is a simplified block diagram depicting an embodiment of a recording system 200 configured to enable failover. The recording system 200 includes telephones 201 and 202, computers 203 and 204, telephony tap 207, and virtual machine hosts 220 and 210. The telephony tap 207 is configured to tap the telephone lines 208 and 209, and to communicate with the virtual machine hosts 220 and 210. The virtual machine host 220 includes a first virtual recorder 221, which is configured to record communications occurring via the telephone 201, the telephone 202, the computer 203, and/or the computer 204. The virtual machine host 210 includes a migrated virtual recorder 211, which is configured to be a backup for the first virtual recorder 221 in case the virtual machine host 220 and/or the first virtual recorder 221 fail. When the virtual machine host 220 and/or the first virtual recorder 221 fail, recording duties are transferred to the migrated virtual recorder 211. Failover may be implemented through communication between the virtual machine host 210, the virtual machine host 220, and/or the telephony tap 207. Failover may also be implemented through communication with another device (e.g., another computer not shown in FIG. 2) configured to enable the failover. Previously known or newly developed failover techniques may be implemented.

In one failover embodiment, for example, the first virtual recorder 221 sends a status message to the migrated virtual recorder 211 at periodic intervals. The status message indicates whether the first virtual recorder 221 is operational. If the migrated virtual recorder 211 receives a status message from the first virtual recorder 221 indicating that the first virtual recorder 221 is in a failed state or if the migrated virtual recorder 211 does not receive a status message for a predetermined interval then the migrated virtual recorder 211 detects a failure and takes over recording functionality for the first virtual recorder 221.

Responsive to detecting the failure, the migrated virtual recorder 211 sends a message to the telephony tap 207 directing the tap 207 to send subsequent telephone data to the migrated virtual recorder 211 instead of the first virtual recorder 221. Responsive to receiving the message from the migrated virtual recorder 211, the telephony tap 207 forwards subsequent telephone data to the migrated virtual recorder 211, which then stores the subsequent telephone data.

In another failover embodiment, for example, redundant recording is implemented. In this embodiment, the telephony tap 207 sends telephone data to both the first virtual recorder 221 and to the migrated virtual recorder 211 so that the formatted telephone data may be stored in both virtual recorders. As a result, if one virtual recorder fails or is de-activated for scheduled maintenance, the recorded telephone data may still be stored by the other virtual recorder.

Figure 3:
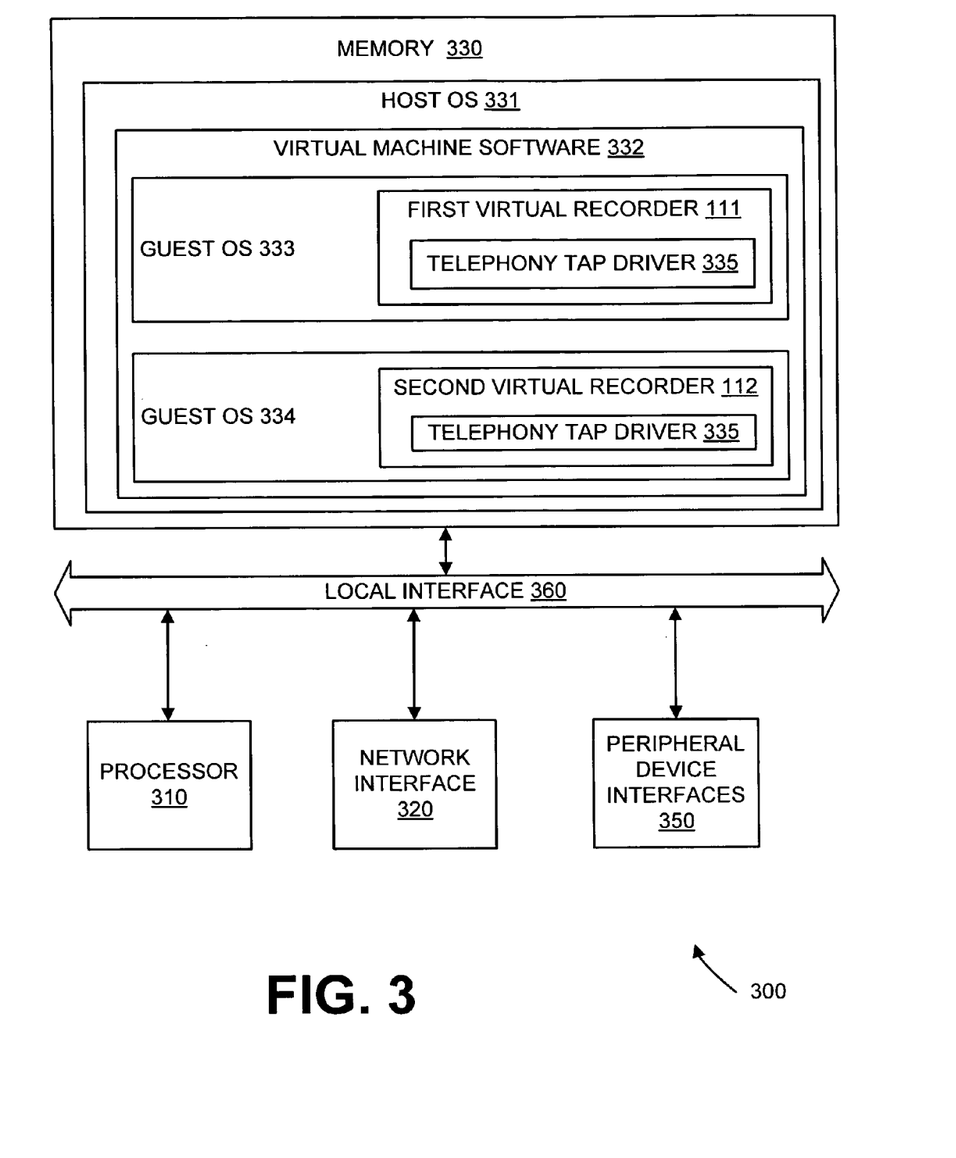
FIG. 3 is a simplified block diagram depicting an embodiment of a virtual machine host in which virtual recorders may be implemented.

FIG. 3 is a simplified block diagram of a virtual machine host 300 in which virtual recorders 111 and/or 112 may be implemented. Generally, in terms of hardware architecture, as shown in FIG. 1, the components of the virtual machine host 300 include a processor 310, a network interface 320, a memory device 330, and peripheral device interfaces 350. These components (310, 320, 330, and 350) may be communicatively coupled via a local interface 360, which may comprise, for example, one or more buses or other wired or wireless connections. The local interface 360 may have additional elements, which are omitted for simplicity, such as controllers, buffers (caches), drivers, repeaters, and receivers, to enable communications.

The processor 310 is a hardware device for executing software, particularly that stored in the memory device 330. The processor 310 can be a custom made or commercially available processor, a central processing unit (CPU), an auxiliary processor among several processors associated with the virtual machine host 300, a semiconductor based microprocessor (in the form of a microchip or chip set), or generally any device for executing software instructions. When the virtual machine host 300 is in operation, the processor 310 is configured to execute software stored within the memory device 330, to communicate data to and from the memory device 330, and to generally control operations of the virtual machine host 300 pursuant to the software.

The peripheral device interfaces 350 may be used to communicate with one or more peripheral devices including, for example, a printer, a copier, a keyboard, a mouse, and/or a monitor, etc. The peripheral device interfaces 350 may include, for example, a serial port, a parallel port, a Small Computer System Interface (SCSI), an infra-red (IR) interface, a radio-frequency (RF) interface, and/or a universal serial bus (USB) interface, among others.

The network interface 320 enables the virtual machine host 300 to communicate with other devices such as, for example, the telephone tap 107 and the computers 103 and 104 (FIGS. 1 and 2). The network interface 320 may be, for example, an Ethernet interface.

The memory device 330 can include any one or combination of volatile and/or non-volatile memory elements now known or later developed. For example, the memory device 330 may comprise random access memory (RAM), read only memory (ROM), a hard disk, a tape, and/or a compact disk ROM (CD-ROM), among others. Note that the memory device 330 can have a distributed architecture, where various components are situated remote from one another, but can be accessed by the processor 310. In a preferred embodiment, the memory device 330 comprises DRAM.

The memory device 330 includes a host operating system (OS) 331, a first virtual recorder 111, and a second virtual recorder 112. The Host OS 331 essentially controls the execution of other applications, and may provide scheduling, input-output control, file and data management, memory management, and/or communication control, among other functionality. The host OS 331 may be for example, a Microsoft™, Macintosh™, or Linux™ based operating system, among others.

The virtual machine software 332 (which may be for example software provided by VMWare™, among others) operates using the host OS 331. The virtual machine software 332 enables a plurality of guest operating systems to function in the virtual machine host 300 by providing a virtual machine environment in which the guest operating systems can function. In this embodiment, the virtual machine software enables the guest OS 333 and guest OS 334 to function. The guest OS 333 and guest OS 334 may be, for example Microsoft™, Macintosh™, or Linux based operating systems, among others.

The first virtual recorder 111 operates using the guest OS 333, whereas the second virtual recorder 112 operates using the guest OS 334. In other embodiments, the first and second virtual recorders 111 and 112 may both operate using the same operating system. The first and second virtual recorders 111 and 112 include respective telephony tap drivers 335 that enable communication with the telephony tap 107 (FIGS. 1 and 2).

The virtual recorders 111 and 112 can be embodied in any computer-readable medium for use by or in connection with an instruction execution system, apparatus, or device, such as a computer-based system or a processor-containing system. In the context of this disclosure, a "computer-readable medium" can be any means that can store, communicate, propagate, or transport a program for use by or in connection with the instruction execution system, apparatus, or device. The computer-readable medium can be, for example, among others, an electronic, magnetic, optical, electromagnetic, infrared, or semiconductor system, apparatus, device, or propagation medium now known or later developed.

Figure 4:
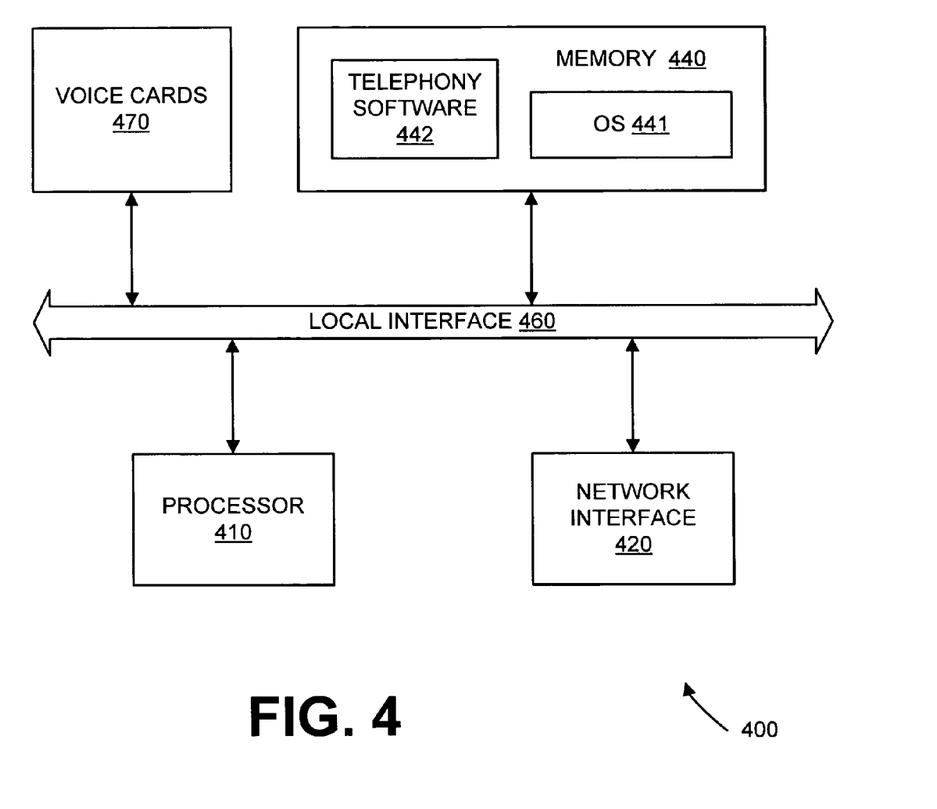
FIG. 4 is a block diagram depicting an embodiment of a telephony tap which is used to tap telephone lines.

FIG. 4 is a block diagram of an embodiment of a telephony tap 400 which is used to tap telephone lines. Generally, in terms of hardware architecture, as shown in FIG. 1, the components of the telephony tap 400 include a processor 410, a network interface 420, a memory device 430, and voice cards 470. These components (410, 420, and 430) may be communicatively coupled via a local interface 460, which may comprise, for example, one or more buses or other wired or wireless connections. The voice cards 470 are used to receive and digitize telephone signals tapped from the telephone lines.

The processor 410 is a hardware device for executing software, particularly that stored in the memory device 430. The processor 410 controls operations of the telephony tap 400 pursuant to the software.

The network interface 420 enables the telephony tap 400 to communicate with other devices such as, for example, the virtual machine hosts 300 and 210 (FIGS. 1 and 2). The network interface 420 may be, for example, an Ethernet interface.

The memory device 430 can include any one or combination of volatile and/or non-volatile memory elements now known or later developed. In a preferred embodiment, the memory device 430 comprises DRAM. In this embodiment, the memory device 430 includes an OS 441 and telephony software 442. The OS 441 essentially controls the execution of the other applications, and may provide scheduling, input-output control, file and data management, memory management, and/or communication control, among other functionality. The telephony software 442 is used to enable transmission of the formatted telephone data to the virtual machine hosts.

Figure 5:
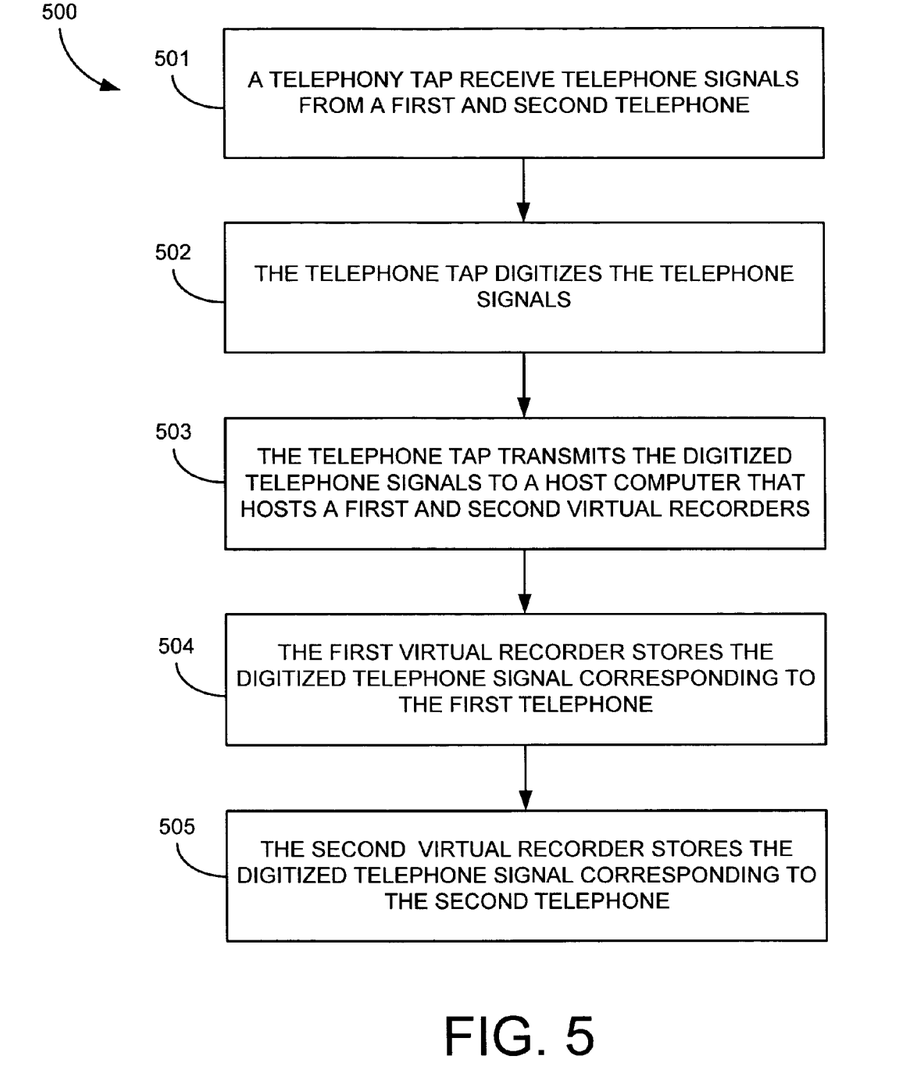
FIGS. 5-7 are flow charts depicting embodiments of methods for recording communications.

FIG. 5 is a flow chart depicting an embodiment of a method 500 for recording communications. According to step 501, a telephony tap receives telephone signals from a first and second telephone. The first and second telephones may be located on the same premises (e.g., a contact center) and may each be a part of a workspace that includes an agent workstation. According to step 502, the telephone tap digitizes the telephone signals, which may then be formatted according to a predetermined data format. According to step 503, the telephone tap transmits the formatted telephone data to a virtual machine host that hosts first and second virtual recorders. The virtual machine host may be at the same customer premises as the first and second telephones or may be remotely located. According to step 504, the first virtual recorder stores the formatted telephone data corresponding to the first telephone. According to step 505, the second virtual recorder stores the formatted telephone data corresponding to the second telephone.

Figure 6:
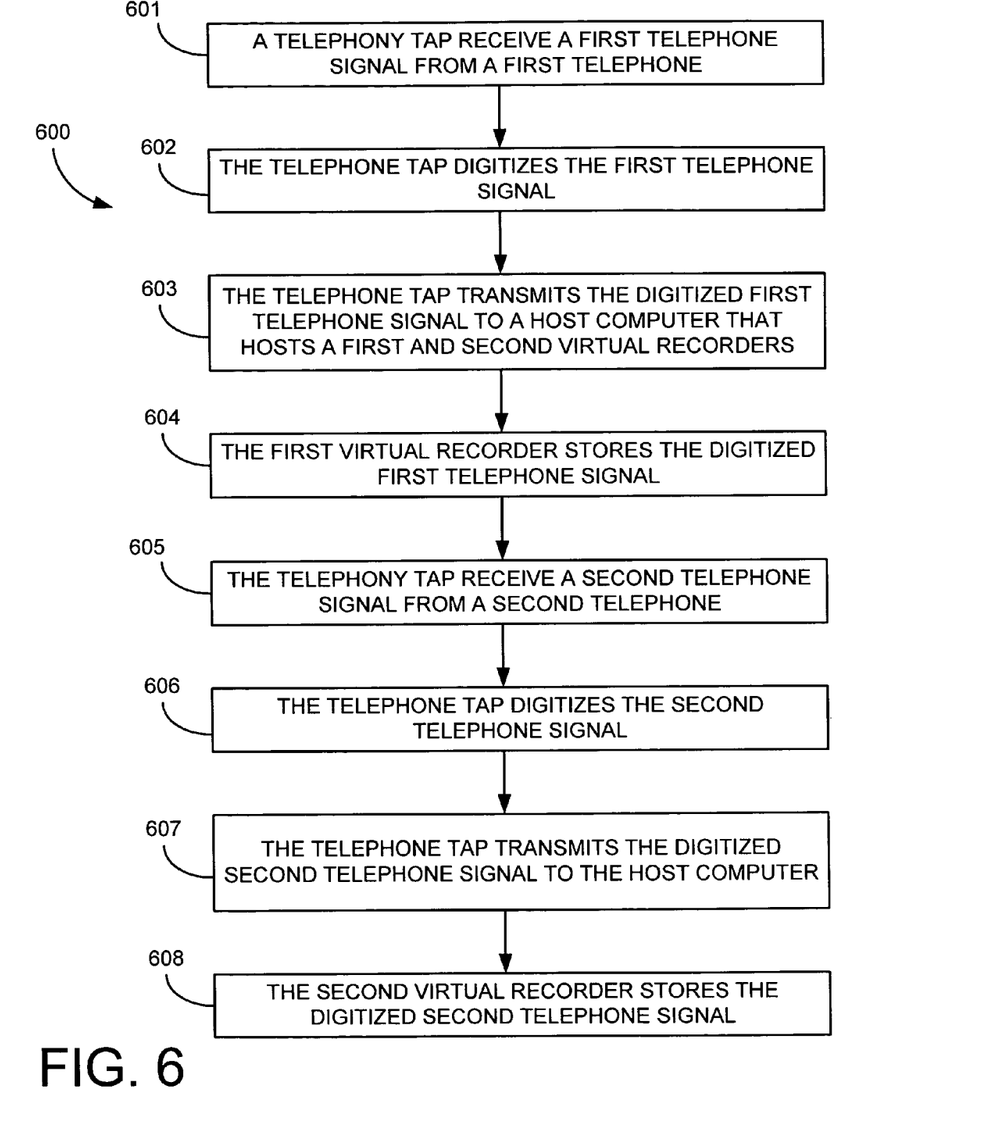

FIG. 6 is a flow chart depicting an embodiment of a method 600 for recording communications. According to step 601, a telephony tap receives a first telephone signal from a first telephone. According to step 602, the telephone tap digitizes the first telephone signal, which may then be formatted according to a predetermined data format. According to step 603, the telephone tap transmits the telephone data corresponding to the first telephone signal to a virtual machine host that hosts first and second virtual recorders. According to step 604, the first virtual recorder stores the telephone data corresponding to the first telephone signal. According to step 605, the telephony tap receives a second telephone signal from a second telephone. According to step 606, the telephone tap digitizes the second telephone signal, which may then be formatted according to a predetermined data format. According to step 607, the telephone tap transmits the telephone data corresponding to the second telephone signal to the virtual machine host. According to step 608, the second virtual recorder stores the telephone data corresponding to the second telephone signal.

Figure 7:
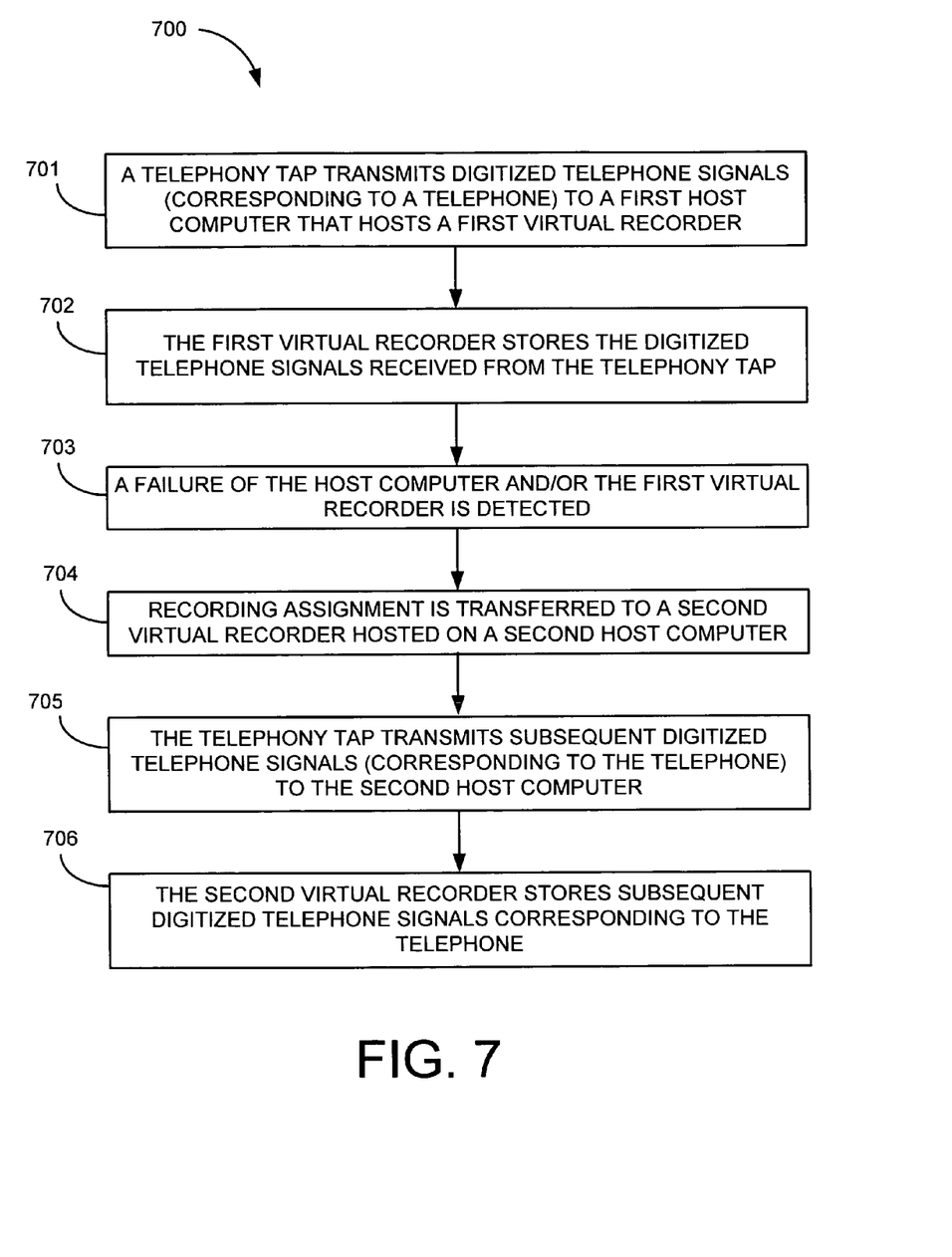

FIG. 7 is a flow chart depicting an embodiment of a method 700 for recording communications. According to step 701, a telephony tap transmits telephone data (corresponding to a telephone) to a first virtual machine host that hosts a first virtual recorder. According to step 702, the first virtual recorder stores the formatted telephone data received from the telephony tap. According to step 703, a failure of the first virtual machine host and/or the first virtual recorder is detected (e.g., by a second virtual machine host). The failure may be the result of a hardware and/or a software malfunction. According to step 704, recording assignment is transferred to a second virtual recorder hosted on a second virtual machine host. This transfer may be accomplished by communication between the first and second virtual machine hosts and/or with the intervention of another computer that monitors the functionality of the first virtual machine host. According to step 705, the telephony tap transmits subsequent telephone data (corresponding to the telephone) to the second virtual machine host. According to step 706, the second virtual recorder (hosted by the second virtual machine host) stores subsequent telephone data corresponding to the telephone.

Figure 8:
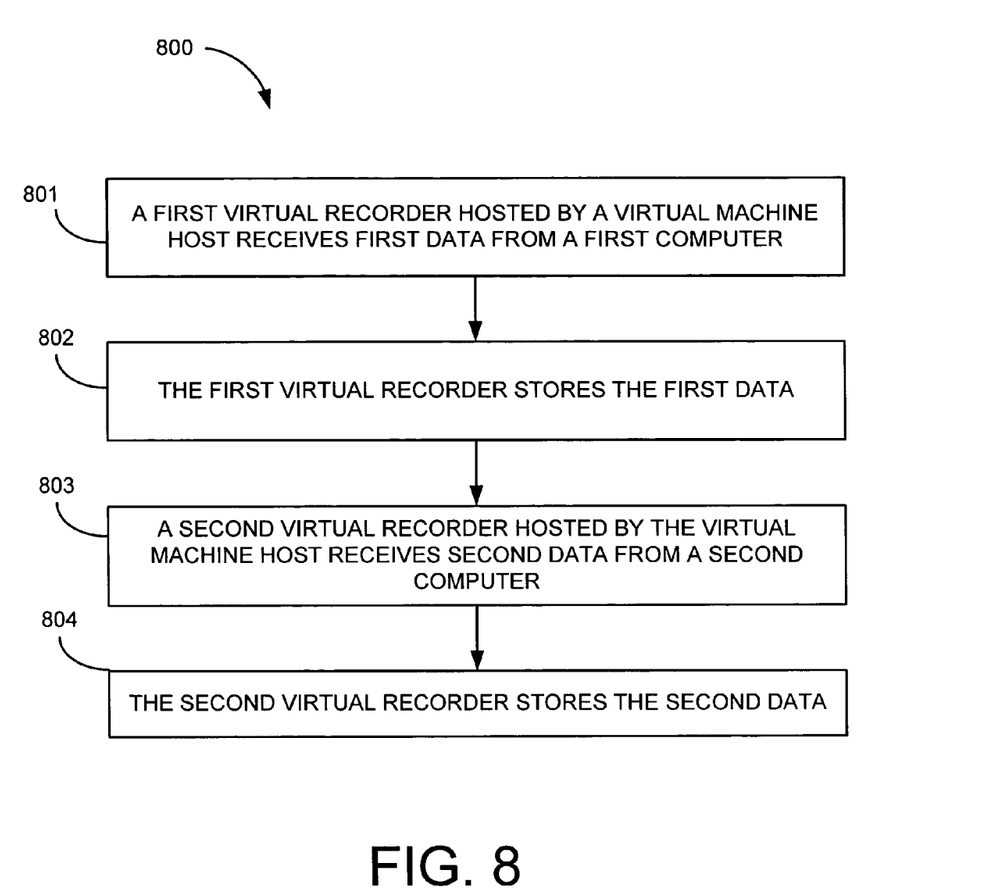
FIG. 8 is a flow chart depicting an embodiment of a method for recording communications.

FIG. 8 is a flow chart depicting an embodiment of a method 800 for storing communications. According to step 801, a first virtual recorder hosted by a virtual machine host receives first data from a first computer. The first data may be requested by the virtual machine host or may, for example, be transmitted at pre-determined intervals by the first computer. The first data may, for example, be related to the performance of an agent at a first contact center workstation and may comprise, for example, screen shots, e-mail data, and/or customer data, among others. According to step 802, the first virtual recorder stores the first data (e.g., in non-volatile memory in the virtual machine host). According to step 803, a second virtual recorder hosted by the virtual machine host receives second data from a second computer. The second data may be requested by the virtual machine host or may, for example, be transmitted at pre-determined intervals by the second computer. The second data may, for example, be related to the performance of an agent at a second contact center workstation and may comprise, for example, screen shots, e-mail data, and/or customer data, among others. According to step 804, the second virtual recorder stores the second data (e.g., in non-volatile memory in the virtual machine host).

Figure 9:
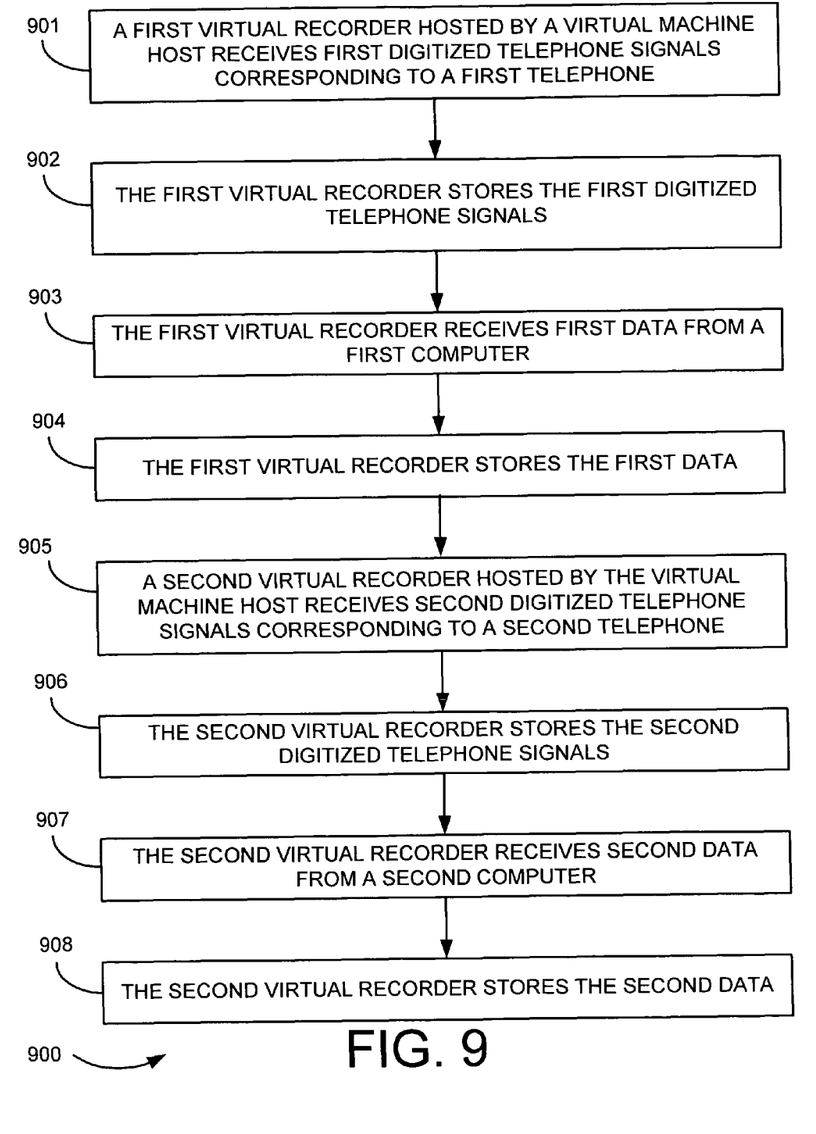
FIG. 9 is a flow chart depicting an embodiment of a method for recording communications.

FIG. 9 is a flow chart depicting an embodiment of a method 900 for storing communications. According to step 901, a first virtual recorder hosted by a virtual machine host receives first telephone data corresponding to a first telephone. According to step 902, the first virtual recorder stores the first telephone data. According to step 903, the first virtual recorder receives first data from a first computer. According to step 904, the first virtual recorder stores the first data. According to step 905, a second virtual recorder hosted by the virtual machine host receives second telephone data corresponding to a second telephone. According to step 906, the second virtual recorder stores the second telephone data. According to step 907, the second virtual recorder receives second data from a second computer. According to step 908, the second virtual recorder stores the second data.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

What is claimed is:

1. A recording system comprising:
    software emulating a virtual machine configured to enable a first guest operating system to function in a virtual machine operating environment;
    a first recording software enabled to function by the first guest operating system;
    at least one processor; and
    at least one communication interface configured to receive first data corresponding to a first contact corresponding to a first contact center agent;
    a second guest operating system enabled by the software emulating a virtual machine to function in a virtual machine operating environment; and
    the second recording software being enabled to function by the second guest operating system;
    wherein said at least one processor is instructed by the first recording software to cause the first data to be stored in memory, and
    wherein said at least one processor is instructed by the second recording software to cause the second data to be stored in memory in the event of a failure of the first recording software.

2. The system of claim 1, wherein the first data encodes a voice communication.

3. The system of claim 1, wherein the first data encodes a screen capture corresponding to a workstation used by the first contact center agent.

4. The system of claim 1, wherein the first contact is facilitated by Internet Protocol (IP) packets.

5. The system of claim 1,
    wherein the at least one communication interface is configured to receive second data corresponding to a second contact corresponding to a second contact center agent.

6. The system of claim 5, wherein the second data encodes a voice communication.

7. The system of claim 5, wherein the second data encodes a screen capture corresponding to a workstation used by the first contact center agent.

8. The system of claim 1, wherein:
    the first recording software functions within the first guest operating system;
    the first guest operating system functions within the software emulating a virtual machine; and
    the software emulating a virtual machine functions within a main operating system.

* * * * *